United States Patent [19]

Krusche

[11] 4,425,759

[45] Jan. 17, 1984

[54] HYDROSTATIC DRIVE SYSTEMS

[75] Inventor: Alfred Krusche, Johannesberg, Fed. Rep. of Germany

[73] Assignee: Linde Aktiengesellschaft, Hollriegelskreuth, Fed. Rep. of Germany

[21] Appl. No.: 324,408

[22] Filed: Nov. 24, 1981

[30] Foreign Application Priority Data

Nov. 24, 1980 [DE] Fed. Rep. of Germany ....... 3044144

[51] Int. Cl.³ .............................................. F16D 31/02

[52] U.S. Cl. ........................................ 60/420; 60/427; 60/452; 60/460

[58] Field of Search ................. 60/420, 427, 452, 460, 60/487

[56] References Cited

U.S. PATENT DOCUMENTS

| | | | |
|---|---|---|---|
| 2,892,312 | 6/1959 | Allen et al. .......................... | 60/427 |
| 4,349,319 | 9/1982 | Byers, Jr. et al. ................ | 60/452 X |

FOREIGN PATENT DOCUMENTS

| | | |
|---|---|---|
| 1528550 | 9/1969 | Fed. Rep. of Germany . |
| 1801137 | 4/1970 | Fed. Rep. of Germany . |
| 1952034 | 4/1971 | Fed. Rep. of Germany . |
| 1755065 | 10/1971 | Fed. Rep. of Germany . |
| 2038414 | 2/1972 | Fed. Rep. of Germany . |
| 1728270 | 3/1972 | Fed. Rep. of Germany . |
| 2146585 | 3/1973 | Fed. Rep. of Germany . |
| 2159766 | 6/1973 | Fed. Rep. of Germany . |
| 2413295 | 10/1975 | Fed. Rep. of Germany . |
| 2440251 | 3/1976 | Fed. Rep. of Germany . |
| 2700803 | 7/1978 | Fed. Rep. of Germany . |
| 133698 | 1/1979 | Fed. Rep. of Germany . |
| 2754430 | 6/1979 | Fed. Rep. of Germany . |
| 2810611 | 9/1979 | Fed. Rep. of Germany . |
| 2823559 | 12/1979 | Fed. Rep. of Germany . |
| 1131750 | 10/1968 | United Kingdom . |
| 1376113 | 12/1974 | United Kingdom . |
| 1413689 | 11/1975 | United Kingdom . |

*Primary Examiner*—Sheldon J. Richter

*Attorney, Agent, or Firm*—Buell, Blenko, Ziesenheim & Beck

[57] ABSTRACT

A hydrostatic drive system with an adjustable pump is provided with branch lines from a main delivery line to several consumers, an arbitrarily actuatable switch in each branch line, an adjustable parallel connecting restrictor in each branch line with an adjusting element loaded on one side by pressure from either the main delivery line or the branch line and on the other side by a spring and control pressure and a source of common control pressure furnishing the control pressure to the adjusting element through a check valve.

29 Claims, 12 Drawing Figures

HYDROSTATIC DRIVE SYSTEMS

This invention relates to a hydrostatic drive system and particularly to a hydrostatic drive system with an adjustable pump.

In particular this invention concerns a hydrostatic drive system for construction machinery, especially for a dredger or backhoe, in which the consumer can be one or more cylinders for raising the boom, at least one cylinder for actuating the scoop, at least one additional cylinder for bending the shaft, at least one additional consumer can be a motor for the travel mechanism, and/or at least one additional consumer can be a hydraulic motor for swinging the dredger or backhoe. In the dredgers or backhoes known to data a delivery line comes from the pump, branch lines lead from this delivery line to an arbitrarily actuatable control valve, where the branch lines coming from these control valves lead to the individual consumers. The individual control valves are generally combined into one control unit block, whose individual sections constitute the control valves for the individual branch lines. The pump is regulated, if at all, only as a function of the pressure in the delivery line. The delivery stream flowing to the individual consumers is arbitrarily regulated only by a more or less wide opening of the control valve assigned. Retroactions that result from a variation in the working pressure in a consumer have to be compensated by the attendant by working the controls.

The applicant provides a hydrostatic drive system preferably using an adjustable pump having a regulating element connected with an adjustable pump piston that is capable of sliding in an adjustable pump cylinder and the position of the piston is determined by a pressure medium controlled by means of a servo control valve, where the drive system has several consumers of hydrostatic energy and a delivery line between the pump and these consumers, as well as a return line leading to a tank, and it has switching elements, in which case several consumers are connected each through a branch delivery line coming from the delivery line to the delivery line coming from the pump and are capable of being connected with the pump by means of an arbitrarily actuatable switching element.

The invention proposes a drive system in which several consumers can be simultaneously loaded from one pump and the delivery stream leading to each individual consumer can be arbitrarily regulated, in which variations in the pressure that arise due to loading on one consumer do not affect the other consumers, but in spite of the parallel connection to each consumer the pressure medium flows with the arbitrarily selected stream with the pressure determined by the loading of the consumer involved.

It is provided for solving this problem that an adjustable parallel-connecting restrictor is loaded in each branch line, where the regulating element of each of these parallel-connecting restrictors is acted upon on one side by the pressure in the delivery line or branch delivery line and on the other side by a control pressure and a pressure spring (or a tension spring on the first-mentioned side) and where the control pressure at all these regulating elements is identical and the sides of the regulating elements that are acted upon by the control pressure are connected to a common control pressure line. It is possible with such an arrangement to adjust the pumps arbitrarily to the desired delivery stream and if more than one consumer is to be connected, to distribute the delivery stream to the desired consumer by arbitrary adjustment of the individual switching elements.

In connection with such restrictors, it should be noted that an arrangement is already known in which two branch lines come from the delivery line of the pump and they lead to a respective cylinder, in which case a restrictor, similar in construction to the said parallel-connecting restrictors, is located in each branch line; the regulating element of this restrictor is acted upon by a pressure spring and a control pressure (DE-OS No. 22 34 562). However, this familiar arrangement does not serve to regulate arbitrarily differing speeds at the cylinders and to switch out pressure retroactions, but in contrast the familiar arrangement serves to maintain the operating speed of both cylinders indentical. Consequently, in this arrangement the control pressure is not the same at all the regulating elements of the restrictors, but the control pressure at the individual regulating elements is regulated as a function of the speed of movement of the piston in the individual cylinders, such that as a function of the different control pressures different throttling actions result at the individual restrictors, dependent on the different piston speeds in the working cylinders.

In contrast, it is essential according to the invention that the regulating elements of all the parallel-connecting restrictors be acted upon by the same control pressure. It can be expedient here if this control pressure acting on all the regulating elements of the parallel-connecting restrictors is the same control pressure that also acts on the regulating element of the adjustable pump.

The control pressure can be achieved in an expedient embodiment according to the invention if a branch line is connected to each line between a parallel-connecting restrictor and the assigned consumer and if all these branch lines are connected to the control pressure line, where a check valve opening toward the overall control pressure line is located in each branch line, with the result that the pressure present at the consumer operating with the maximum pressure acts through the opened check valve on the overall control pressure line and thus the regulating elements of all the parallel-connecting restrictors, while all the other check valves in the other branch control lines remain closed, with the result that the lower consumer pressures have no effect on the parallel-connecting restrictors.

Another design of a hydrostatic drive system for dredgers or backhoes has also recently become known, in which the switching element in the branch line leading to a consumer is constructed as an arbitrarily adjustable metering restrictor, where the pressure gradient at this metering restrictor acts on the pump regulating element and regulates the delivery stream of the pump so that a predetermined pressure gradient always develops at this metering restrictor, independently of the gap width arbitrarily imposed on the metering restrictor. That is, the pressure in front of this metering restrictor, i.e., the pressure in the delivery line of the pump, acts on one side of the regulating element of the pump and the pressure beyond the metering restrictor acts through the control pressure line on the other side of the regulating element of the pump. The application of the basic features of this invention is particularly advantageous in such a hydrostatic drive system, i.e., a particularly advantageous design of a hydrostatic drive system results, especially for dredgers or backhoes or similar machines, if the above described control system with a metering throttle is combined with the system with parallel-connecting restrictors according to the invention.

Independently of whether this combination is selected or not, an expedient design of a drive system results if not only the delivery lines are combined into one system, but also the return lines, so that a branch return line comes from each consumer and all these branch return lines are connected to a collecting return line. This collecting return line can then be laid parallel to the delivery line.

There is also an expedient construction in drive systems with pumps that draw from the housing if the collecting return line is connected directly to the housing so that the stream flowing back through the return line flows through the collecting return line directly into the housing of the pump, from which the pump again draws. In such an arrangement it is however recommended to provide measures that effect an exchange of the pressure medium—normally oil—so that the pressure medium is passed through a filter on the one hand and that there are better possibilities of heat removal or of mixing hot oil with a larger volume of oil not directly in the circulation on the other. The same is also true from the standpoint of aging of the oil. The said arrangement with a collecting return line also facilitates another expedient construction, based on the fact that a prestressed pressure reservoir is connected to this collecting return line. As a result, the internal chamber of the pump is maintained under the pretensioning pressure of the reservoir so that suction is facilitated with high flow velocities. The volume of the pressure reservoir is expediently selected so that variations in the total oil volume contained in the drive system at a definite point in time can be equalized, i.e., that the reservoir can handle the volume even if several working cylinders are simultaneously loaded with pressure on the pressure chamber on the piston rod side, and vice versa.

In a drive system, in which at least one of the consumers can be operated in both directions, that is, one of its two connections can be selectively loaded with pressure and the other can be connected as a return line, it is expedient if a parallel-connecting throttle is located in both lines connected to a connection of the consumer, in which case the control pressure lines of these two parallel restrictors are connected to a common collecting control pressure line. Inversely, two or more consumers connected parallel to each other can be connected to a parallel-connecting restrictor. If all these consumers can be operated in both directions, two parallel-connecting restrictors are expediently provided, one of which is connected with one side of all the consumers and the other is connected with the other side of all the consumers. If if is certain that the consumers travel in one direction only in a powerless manner, that is, no pressure develops, it can be sufficient if a parallel-connecting restrictor is assigned to only one consumer side provided it is assured that either no second consumer can be switched in or, if a second consumer can be switched in, that it carries the same pressure. A particularly expedient design results if all the parallel-connecting restrictors assigned to one consumer are combined into one control unit. That is, both the parallel-connecting restrictor that is in the line that is the delivery line in one direction of movement and also the parallel-connecting restrictor that is in the line that is the delivery line in the case of movement in the other direction are combined into one control unit. The same is true if several consumers are combined into one consumer group. It is particularly expedient if this control unit is attached directly to the consumer. The attachment of regulating elements, i.e., solenoid valves, directly on the consumer is indeed already known, but since control units of the type discussed here are not known, their installation directly on the consumer is also unknown.

A particularly expedient construction results if not only the parallel-connecting restrictor, but also the metering restrictor or parallel-connecting restrictors and metering restrictors are combined in the control unit and preferably attached to the assigned consumer.

A particularly simple construction of the parallel-connecting restrictors results if, as is known, the parallel-connecting restrictor is equipped with a valve slide, which at the same time is the regulating element, on whose face the pressure in the delivery line acts and on whose back side the control pressure and the pressure spring act.

In the case of a consumer that can be driven in both directions, in which one connection can selectively be a pressure connection and the other can be a return connection, or vice versa, additional problems arise in a drive system with open circulation if undesirable movements of the consumer have to be prevented, that is, the movement of the consumer must always be correctly controllable by the stream flowing to the consumer. If a force acts on the consumer in the controlled direction of movement, the consumer must be prevented from generating an underpressure in the delivery line and the intended movement from speeding up under the resulting force if the said dependence on the stream fed in is to be assured, In an additional advantageous construction of the invention this can be achieved particularly expediently in connection with the parallel-connecting restrictors of the invention by providing a controlled restrictor, preferably a controlled relief valve jet, in the return line, in which case the control mechanism is dependent on the pressure in the delivery line, so that if the pressure in the delivery line drops below a predetermined level as a result of a speeding-up of the consumer, this pressure controls the restrictor or the relief valve jet in the return line in the direction to the closed position, with the result that the stream flowing off is throttled and thus the consumer is prevented from accelerating past the predetermined speed of movement. On the other hand, the consumer must be prevented from effecting unintended movements when the line leading to the consumer becomes pressureless, e.g., due to a break in the line. For this purpose, a check valve is installed in the delivery line in the immediate vicinity of the consumer; it then closes if the pressure in the pressure chamber connected to the delivery line becomes greater than the pressure in the delivery line. Such check valves for assuring against tube rupture are always required or at least advantageous if the consumer can effect a movement under load and danger can arise with an undesirable movement in the opposite direction. This is true for example in dredgers or backhoes when the boom is being raised, while during lowering it is more important to be able to control the return movement by throttling in the drain line.

It is particularly advantageous if these supplementary elements, namely, relief valve jet or adjustable restrictors and check valves, possibly including the supplementary resuction check valves that are necessary or advantageous, are incorporated into the control unit attached directly to the consumer.

In dredger or backhoe drives with two pumps and two control mechanism blocks assigned to each pump, various switching arrangements are known that are to facilitate conveyance of the delivery streams of both pumps to one consumer, where several of these familiar switching arrangements merely facilitate conveying the delivery streams of both pumps to a specific one of the consumers. The design according to the invention permits a better and simpler solution, such that the delivery lines and the control pressure lines of both pumps are connected to a coupling device that contains a pressure-controlled 4-connection/2-position valve that connects the delivery lines and control pressure lines together when a certain operating condition is present. This operating condition that initiates the connection is preferably a definite prescribed pressure difference between the delivery line and the assigned control pressure line, in which case this pressure difference is smaller than the pressure difference provided at the metering throttle. This means that if the metering restrictor is aribitrarily given a specific gap width and the delivery stream of the pump when the latter is fully swing out is not sufficient to achieve the anticipated pressure gradient at the metering restrictor and this pressure gradient becomes smaller than a prescribed limit valve, the coupling device responds and connects the control pressure lines and the delivery lines together, preferably first the control pressure lines and then the delivery lines with each other, In the hydrostatic drive systems known to date for dredgers or backhoes with pumps regulated by the pressure in the delivery of the pump, power control devices are known in which an adjusting piston loaded by the delivery pressure is capable of being displaced against the force of a spring and the stroke volume of the pump is reduced with increasing delvery pressure such that the product of delivery pressure and stroke volume per revolution and thus the power input remain constant. In dredger or backhoe drives with two pumps, summation power control devices are provided; they are acted upon by the pressures in the two delivery lines and swing the two pumps back jointly so that the product of the sum of the pressures and the sum of the streams remains constant, i.e., the power input also remains constant here. This type of regulation has two essential shortcomings, namely that the power absorbed by the secondary power take-offs, for example, other pumps, compressors, or generators, is not taken into account by the regulator. The power to which the regulator regulates must thus be so much smaller than the maximum power that all the secondary drives can simultaneously absorb in common. This has the result that the drive power installed in the primary energy source normally cannot be absorbed; the primary energy source is thus almost always running in an unfavorable partial-load state. Another disadvantage results from the coupling of the two pumps so that they always swing back identically. If two movements that mutually overlap are simultaneously effected and the regulator engages in this operating state, the overlapped resulting direction of movement is thus modified. For example, if the rotating mechanism is switched in during raising, the regulator engages in the acceleration phase and swings both pumps back by the same amount in the direction to a smaller stroke volume per revolution. According to the speed specfication, the intended direction of movement is thus modified and the attendant must intervene in a corrective manner. If the rotation acceleration is completed, both pumps again swing in the direction to a greater stroke volume per revolution as a result of the decreasing delivery pressure. The ratio of the two consumer speeds is again modified and the intended direction is again thus changed. This characteristic of the familiar regulator systems is always perturbing if two or more movements are carried out simultaneously and the power control device engages. In other drive systems regulators are, of course, also known that base their regulating value of the r.p.m. of the output shaft of the primary energy source or the drive shaft of the pump and determine whether this r.p.m. corresponds to an r.p.m. specified, e.g., by the setting of the primary energy source, for example, the injection pump of a Diesel engine. If the r.p.m. of the drive shaft drops below the prescribed limit value due to overloading of the primary energy source, the maximum-load regulator engages and adjusts the pump or pumps to a smaller stroke volume per revolution and thus a smaller torque input. This system also takes into account the power consumption of the secondary drives.

The combination of such a maximum-load regulation with a drive system of the type described above such that the maximum-load regulator generates a pressure gradient that acts directly on the servo control valve of the pump adjusting element is particularly advantageous.

It is also known and in most cases necessary, for the protection of such drive systems, to connect a relief-valve jet to the delivery line in order to prevent an inadmissibly high pressure from developing in it and thus to prevent an element connected to the delivery line, whether a control element of the consumer or the pump, from being destroyed or at least damaged, or the delivery line itself from being ruptured. An opening of this relief valve jet has the disadvantageous result that the pressure medium flows off under the high pressure present in the delivery line, such that a great deal of energy is wasted and the pressure medium is highly heated. In order to avoid this shortcoming, it is advantageous to swing the pump back to a smaller stroke volume per revolution before the delivery pressure at which the relief valve jet connected to the delivery line is set is reached. For this purpose, it is already known in the case of a hydrostatic drive unit to connect a switching device to the delivery line, which is connected through an actuation element with an element that regulates the control pressure in direction of flow in front of the maximum-load regulator, so that the control pressure is reduced when a maximum permissible pressure in the delivery line is exceeded. Such a device is shown in German application DE-OS No. 24 59 795. The combination with the device according to the invention is particularly advantageous and expedient, such that a second relief valve jet is connected to the control pressure line that leads to the servo control valve that regulates the setting of the pump adjusting element, the response pressure of which is set so much lower than the response pressure of the relief-valve jet connected to the delivery line (in which case, the pressure gradient intended at the metering throttle must be taken into account in a switching arrangement with such a valve) so that the relief valve jet that immediately reduces the control pressure at the servo control valve opens before the pressure in the delivery line has reached a valve such that the relief valve jet connected to the delivery line opens. This has the result that the pump is regulated back to a smaller stroke volume per revolution and thus a smaller delivery stream before the relief valve jet connected to the delivery line responds.

In order to exclude the possibility of the parallel-connecting restrictor closing and thus enclosing pressure medium in the delivery line between the consumer and the parallel-connecting restrictor under pressure and thus holding the relief valve jet provided in the return line open, even though it is not at all expedient in this state, another advantageous construction is provided in which a line in which a check valve opening toward the pump is located is connected parallel to the parallel-connecting restrictor. In one favorable construction this check valve can be incorporated into the slide valve body of the parallel-connecting restrictor.

Controls are known to date that are acted upon by the delivery pressure of the pump and influence its adjusting element such that the pump is adjusted to a smaller stroke volume per revolution with increasing delivery pressure. These arrangements are known to date only in a closed circulation such that the delivery pressure of the pump is preselected with the setting arbitrarily imposed on an actuating element and thus the moment or power developing at the consumer is specified in advance. Energy losses can be reduced with these arrangements.

According to another step of the invention, the arrangement with one control pressure line in the case of several consumers, which can be arbitrarily connected parallel to each other, is utilized in which case a pressure regulation is effected through a valve, where the slide of this valve is loaded on one side by an arbitrarily actuatable control pessure pickoff and on the other side by the pressure of the consumer, so that when the control pressure-pick-off is actuated, an equilibrium state sets in at the valve slide between the pressure of the control pressure pick-off and the pressure in the pressure-loaded line leading to the consumer. If the pressure in this pressure-loaded line leading to the consumer drops, the valve is opened further so that a larger stream flows to the consumer and thus the pressure at the consumer is increased as a function of the consumer characteristic expected. A specific pressure development at the consumer can also be preselected by this valve, thus by a setting arbitrarily imposed on a control pressure pick-off, also assuming here that the force retroaction at the consumer increases with increasing delivery stream. The pressure regulation is thus effected in this new arrangement by a valve, with the advantage that this arrangement can be connected to the line system according to the invention, with the delivery line coming from the pump, a return line, and a control pressure line carrying the control pressure that acts on the servo control valve of the pump. This control unit can in this case also be connected or built into the consumer directly and contain additional resuction check valves, tube rupture-protection valves, and relief-valve jets, where the control pressure line is imposed through a check valve in the line in this case also. The purpose of these arrangements is a regulation to a constant, arbitrarily selectable pressure and thus a constant power or moment. Energy losses can also be reduced with these arrangements.

In the foregoing general description of my invention and its operation I have set out certain objects, purposes and advantages of this invention. Other objects, purposes and advantages of this invention will be apparent from a consideration of the following description and the accompanying drawings in which.

Figure 1:
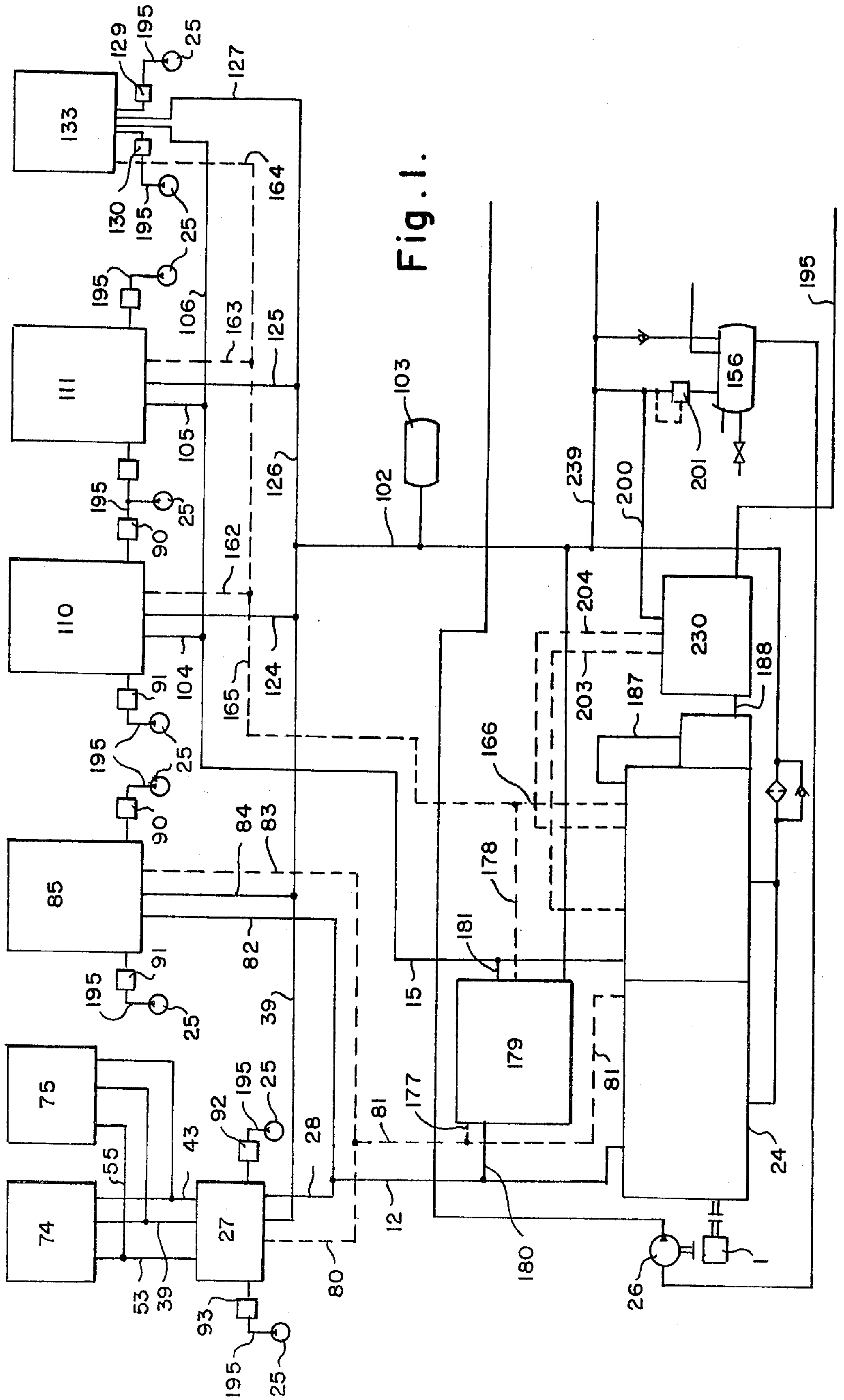
FIG. 1 shows an overall circuit diagram with the individual components indicated in the overall view of FIG. 1 only in rough outline.
Figure 2:
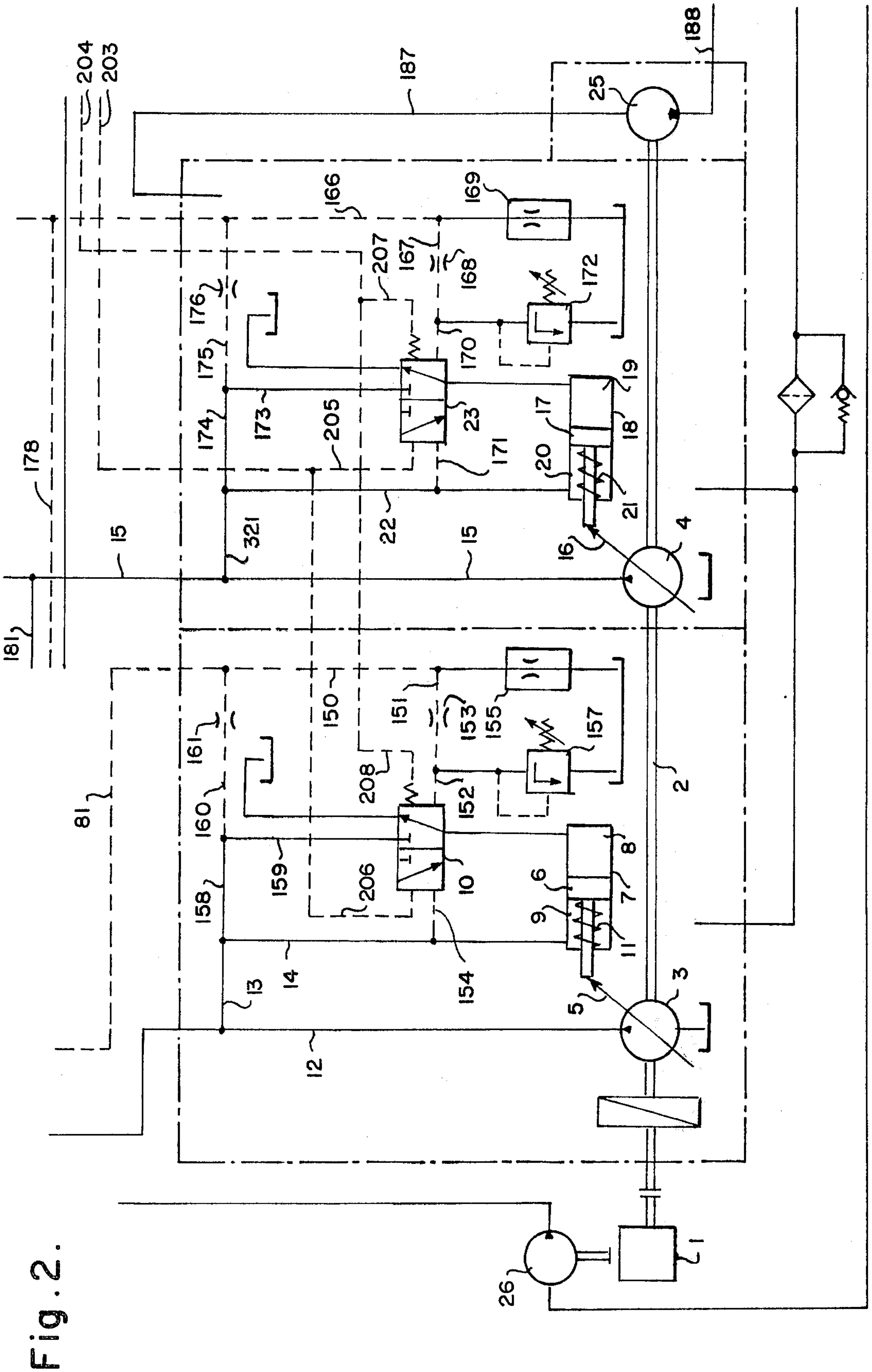
FIG. 2 shows the circuit diagram for the double-pump unit identified as 24 in FIG. 1.
Figure 3:
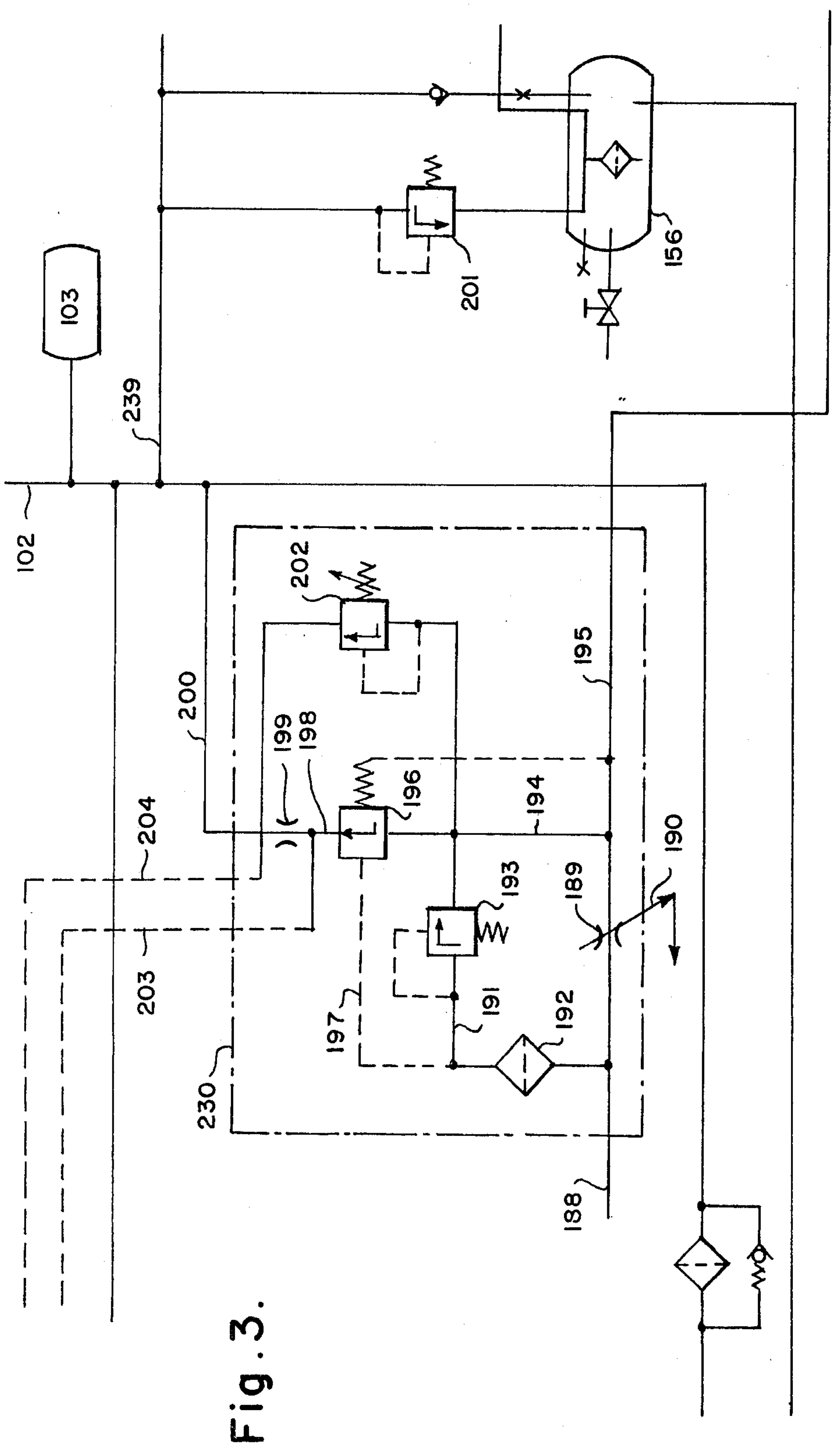
FIG. 3 shows the circuit diagram for the maximum-load control unit identified as 230 in FIG. 1.

Referring to the drawings, the pumps 3 and 4 are driven by the internal-combustion engine 1 through the shaft 2. The adjusting element 5 of pump 3 is connected with a pump adjusting piston 6 that is capable of sliding in a pump adjusting cylinder 7 and divides it into two pressure chambers 8 and 9. The pump 3 delivers into a delivery line 12, from which the pressure chamber 9 is loaded through branch lines 13 and 14; a spring 11 is located in the pressure chamber 9. Loading of the pressure chamber 8 is controlled through a hydraulically controlled servo control valve 10.

The pump 4 feeds into a delivery line 15. The adjusting element 16 of the pump 4 is connected with a pump adjusting piston 17, which is capable of sliding in a pump adjusting cylinder 18 and divides it into two pressure chambers 19 and 20, where a spring 21 is located in the pressure chamber 20. This pressure chamber 20 is connected through a branch line 321 and an additional branch line 22 to the delivery line 15. Loading of the pressure chamber 19 is controlled through a hydraulically regulated servo control valve 23. Both pumps 3 and 4 are located in a common housing 24.

Two other pumps 25 and 26, designed as constant pumps, are driven from the shaft 2 (the pump 26 can however, in another construction form, also be driven from a secondary power take-off of the engine 1).

A branch delivery line 28 branches off from the delivery line 12; it lead to a partial control unit 27 in which the branch delivery line 28 is divided into two partial lines 29 and 30. Each of the two partial lines 29 and 30 leads to a single-edge servo valve spool 31 or 32, where the valve spool 31 is hydraulically controlled and is loaded with pressure through a pressure pick-up control line 33 by an arbitrarily actuatable control pressure pick-up 92 located in the operator's cab of the dredger or backhoe. In just such a manner, the hydraulically controlled single-edge servo valve spool 32 is loaded with control pressure though a pressure pick-off control line 34, where the latter line 34 leads to another, arbitrarily actuatable control pressure pick-off 93, also located in the operator's cab. The single-edge servo valve spools 31 and 32 act as metering restrictors, through which a throttled flow is fed from the partial line 29 to the line 35 or from the partial line 30 to the line 36. In the other position the single-edge servo valve spool 31 connects the line 35 with the return line 37 and in just such a manner the single-edge servo valve spool 32 connects the lines 36 and 38 in the other position, where the two return lines 37 and 38 jointly lead to the branch return line 39.

The line 35 leads to a parallel-connecting restrictor 40 with a slide valve 41, whose back side is loaded by a spring 42 and by the control pressure in the control pressure line 53. A line 43 comes from the parallel-connecting restrictor 40; it separates into two lines 44 and 45, each of which leads to a pressure chamber 46 or 47 of the two working cylinders 48 and 49 connected in parallel to each other and provided on the dredger for "lifting".

Analogously, the line 36 leads to a parallel-connecting restrictor 50 with a slide valve 51, the back side of which is loaded by a spring 52 and by the pressure present in a control line 53. A line 53 comes from the parallel-connecting restrictor 50; it is divided into two lines 54 and 55, line 54 of which leads to the pressure chamber 56 of the working cylinder 48 and line 55 leads to the pressure chamber 57 of the working cylinder 49.

A check valve 58 opening toward the working cylinder 48 is located in line 54. Between the check valve 58 and the working cylinder 48, a line 59 is connected to the line 54; it leads to a controlled relief valve jet 60, whose drain leads through line 61 and line 62 to the partial return line 39. A line 63 is also connected to line 54 between the check valve 58 and the working cylinder 48, in which line 63 a resuction check valve 64 is located and is connected on the other hand to the line 62.

Analogously, a check valve 68 is located in line 44 and a line 65 is connected between valve 68 and the working cylinder 48; a resuction check valve 66 is located in line 65 and is also connected to the line 62. A line 69 is also connected to line 44 between the check valve 68 and the working cylinder 48; it leads to a hydraulically controlled relief valve jet 70, whose drain line 71 is connected to the line 62. The control pressure chamber of the relief valve jet 70 is connected through line 72 to line 54 in front of the check valve 58 and in precisely the same manner the control pressure chamber of the relief valve jet 60 is connected through line 73 to line 44 in front of the check valve 68. If line 54 is carrying pressure, the control pressure chamber of the relief valve jet 70 is loaded by this pressure and thus the relief valve jet is relieved of spring pressure, so that it opens with a more or less slight pressure in the line 44, and inversely the same is true for the relief valve jet 60 if the line 44 carries pressure in front of the check valve 68.

These valves 58, 64, 60, 70, 68, and 66 are combined in one control unit 74 that is attached directly to the working cylinder 48.

An analogously identical valve arrangement is provided in the control unit 75, which is attached to the working cylinder 49.

A line 76 is connected to line 53 inside the partial control unit 27; it leads to a check valve 77. Likewise, a line 78 is connected to line 43; it leads to a check valve 79. The two check valves 77 and 79 are on the other hand connected to the partial control pressure line 80, to which the pressure chambers behind the slide valves 41 and 51 are also connected.

A relief check valve 94 opening toward the line 35 is located in the slide valve 41. In the same manner, a relief check valve 95 opening toward line 36 is located in the slide valve 51. The control pressure line 80 leads to an overall control pressure line 81, to which a branch control pressure line 83 is connected. A branch line 82 is connected to the delivery line 12. The two branch lines 82 and 83 lead to an overall control unit 85, from which a return line 84, which is connected to the return line 39, departs. The overall control unit 85 is attached to the working cylinder 86, which serves to actuate the shovel of the dredger. The overall switching arrangement of the control unit 85 is analogous to the sum of the partial control unit 27 and the control unit 74. Two single-edge servo valve spools 86 and 87 are provided, of which spool 86 is loaded through a pressure pick-off control pressure line 88 by an arbitrarily actuatable control pressure pick-off 90, which is located in the vicinity of the control pressure pick-offs 92 and 93, which in turn load the pressure pick-off control pressure lines 33 and 34. Accordingly, the single-edge servo valve spool 87 is regulated by means of a pressure pick-off control pressure line 89, which in turn also leads to an arbitrarily actuatable control pressure pick-off 91, which is located in the vicinity of the control pressure pick-offs 90, 92 and 93.

A parallel-connecting restrictor 96 or 97 is connected beyond each of the two single-edge servo valve spools 86 and 87 which act as metering restrictors; beyond it, a branch line leading to the partial control pressure line 83 and with a check valve 100 or 101 branches off at a connection point 98 and 99.

The return line 39 leads to a main return line 102 that leads directly into the housing 24 of the pumps and is connected to a prestressed reservoir 103.

The branch lines 104, 105 and 106 branch off from the delivery line 15 coming from the pump 4. Line 104 leads to a working cylinder 107 for bending the shovel shaft, line 105 leads to a hydraulic motor 108 for traveling, and line 106 leads to a hydraulic motor 109 for swivelling the dredger. The overall control units 110 and 111 are constructed the same as the overall control unit 85. This means that they each contain two single-edge slide valves 112 or 113 or 114 or 115 and a parallel-connecting restrictor 116, 117, 118 or 119 is subsequently connected, in which case the valve 112 is loaded from an arbitrarily actuatable control pressure pick-off 120, the valve 113 is loaded from a control pressure pick-off 121, valve 114 is loaded from a control pressure pick-off 122, and valve 115 is loaded from a control pressure pick-off 123. The partial return lines 124 and 125 coming from the overall control devices 110 and 111 all lead to a branch return line 126, which is connected to the main return line 102. The same is true for the return line 127. The lines 106 and 127 are connected at a 4-connection/3-position valve 128, which is controlled hydraulically by the two control pressure pick-offs 129 and 130 and selectively connects either the one connection 131 of the hydraulic motor 109 with the delivery line 106 and the other connection 132 of the hydraulic motor 109 with the return line 127 or, inversely, the delivery line 106 with the connection 132 and the return line 127 with the connection 131. A supplementary control unit 133 is also provided here; it is attached directly to the hydraulic motor 109. Two check valves 134 and 135 and two relief valve jets 136 and 137 and connections 138 and 139 for a control pressure line 140 are provided in it, where the check valves 141 or 142 are located between the control pressure line 140 and the connections 139 and 138.

The overall control pressure line 81 assigned to the pump 3 continues in the control pressure line 150, which leads to a branch line 152 in which a restrictor 153 is located and which leads to a pressure chamber of the hydraulically controlled servo control valve 10. The opposite pressure chamber is connected through the branch line 154 to the line 14, which is loaded with the delivery pressure in the delivery line 12 of pump 3.

A flow regulator 155 is also connected to the line 150; its discharge leads into the internal chamber of the housing 24 of the pumps 3 and 4.

A relief valve jet 157 is connected to the line 152 between the restrictor 153 and the control pressure chamber of the servo control valve 10.

A line 158 comes from the line 13 and leads to a connection 159 of the servo control valve 10 so that pressure medium delivered through this line 158 and the connection 159 from the pump 3 can be passed through the delivery line 12, the lines 13 and 158 and the connection 159 through the servo control valve 10 into the pressure chamber 8.

There is a connecting line 160 between the line 158 and line 150 and a by-pass restrictor 161 is located in it (this line 160 with the restrictor 161 can be omitted if the servo control valve 10 is designed with a sufficiently large negative overlap so that when the servo control valve 10 is in the neutral position a partial flow continuously flows through the lines 12, 13, 158 and the connection 159 to the pressureless tank 156 or preferably into the internal chamber of the housing 24 of the pumps 3 and 4. This solution has the advantage that the flow regulator 155 does not have to be additionally adjusted to the stream flowing through the by-pass restrictor 161).

Partial control pressure lines 162, 163 and 164 come from the control units 110 and 111 and from the control device 133 and they are connected to an overall control pressure line 165, which continues in the line 166, to which the line 167 with the restrictor 168 is connected and to which the flow regulator 169 is connected. The line coming from the restrictor 168 leads to a pressure chamber of the hydraulically controlled servo control valve 23, while its opposite pressure chamber is connected through the connection 171 to the line 22. A relief valve jet 172 is connected to the line 170.

The connection 173 of the servo control valve 23 is connected through the line 174 to the line 321. A connecting line 175 is located between the lines 174 and 166 and it contains a by-pass throttle 176 (the same is true here as with regard to line 160 and restrictor 161).

A coupling control line 177 is connected to the overall control pressure line 81 and a coupling control line 178 is connected to the overall control pressure line 165; both of these control lines lead to the coupling unit 179. A 4-connection/2-position valve 182 is located in the latter; it is hydraulically controlled and has two control pressure chambers on each side, where a control pressure chamber of the same size on the one side is assigned to each control pressure chamber on the other side, in which case however it is not necessary for the two control pressure chambers on the one side to have the same diameter. A branch line 180 leads from the delivery line 12 into the coupling unit 179 and a branch line 181 also leads from the delivery line 15 into the coupling unit 179. The two lines 180 and 181 are connected to the 4-position/2-way valve 182 here such that in the position of the latter as shown the lines 180 and 181 are connected together and in the other position these lines are shut off. The control pressure lines 177 and 178 are connected to the two other connections of the 4-connection/2-way valve 182 such that in the setting of the valve slide shown the lines 177 and 178 are connected together.

Two relief valve jets 184 and 185 are also located in the coupling unit 179, of which the valve 184 serves to protect the delivery line 12 and is connected to it through line 180, while valve 185 serves to protect delivery line 15 and is connected to it through line 181.

The line 180 loaded by the delivery pressure of pump 3 and the line 177 loaded by the control pressure assigned to pump 3 are connected on opposite sides to pressure chambers of identical size and the line 181 loaded by the delivery pressure of pump 4 and the line 178 loaded by the control pressure assigned to pump 4 are connected to the pressure chambers of identical size of the 4/2-way valve 182 located on opposite sides, such that the two lines 177 and 178 loaded by the control pressure are connected on the side on which the pressure spring 186 is located.

The constant pump 25 draws through line 187 from the housing 24 of the pumps 3 and 4 and delivers into a line 188 that leads to an adjustable restrictor 189, whose adjusting element 190 is in operating connection with the adjusting element of the engine 1. A relief valve jet 193 is connected in front of the restrictor 189 to the line 188 through a line 191 in which a filter 192 is installed; its discharge is connected to a line 194, which in turn is connected to the line 195 which forms the continuation of line 188 beyond the restrictor 189, and which leads to additional consumers (not shown in the drawing).

A controlled relief valve jet 196 is also connected to line 194; its control pressure is determined through line 197 by the pressure in front of the restrictor 189. The line 198 coming from the relief valve jet 196 leads to a restrictor 199 and the line 200 coming from the latter leads through a relief valve jet 201 to the tank 156. Parallel to the consecutively connected relief valve jet 196 and restrictor 199, another relief valve jet 202 is connected; it maintains the pressure constant in front of the relief valve jet 196. The essential point is that the pressure gradient at the restrictor 189 controls the relief valve jet 196, which in turn regulates the stream to the restrictor 199.

A maximum-pressure control line 203 branches off from the line 198 between the relief valve jet 196 and the restrictor 199 and a second maximum-pressure line 204 branches off from the line 200. The line 203 branches into two lines 205 and 206, which empty into a control pressure chamber of the servo control valve 10 or 23, on the same side on which it is loaded by the delivery pressure of the assigned pump 3 or 4. Two lines 207 and 208 branch off from the line 204; they lead to the other, spring-loaded side of the hydraulically controlled servo control valve 10 or 23.

The mode of operation is as follows: When the engine 1 is running and is driving the pumps 3, 4, 25, 26 and all the control pressure pick-offs 93, 92, 91, 90, 120, 121, 122, 123, 130, 129 are not actuated, the pumps are in the zero-stroke position and do not deliver. None of the consumers is acted upon. Now if the control pressure pick-off 92 is actuated, the single-edge servo valve spool 31 is actuated and opens so that it effects a connection between the delivery line 12 and the line 44 to the working cylinder 48, in which case the parallel-connecting restrictor 40 opens. Check valve 79 opens at the same time so that line 80 and thus line 81 are also loaded with pressure.

Because the single-edge servo valve spool 31 acts as a metering restrictor, the pressure in line 35 and thus the pressure in line 43 and thus also the pressure in line 78 and in line 80 and in line 81 are less than the pressure in the branch delivery line 28 and the delivery line 12. The pressure in the delivery line 12 acts through the lines 13, 14 and 154 on one side of the servo control valve 10 and the pressure in the control pressure line 81 acts through the lines 150, 151, 152 on the other side of this servo control valve, on which the spring also acts. The spring is designed here so that the servo control valve 10 responds at a quite specific difference between the pressures in the lines 154 and 152, e.g., to a pressure difference of 20 bar. As a result, the adjusting element 5 of pump 3 is regulated by means of the servo control valve 10 through the pump adjusting piston 6 so that it delivers a stream that generates this predetermined pressure gradient at the single-edge servo valve spool 31 which acts as a metering restrictor. That is, if the setting of the single-edge servo valve spool 31 is modified by changing the setting of the control pressure pick-off 92, the pump 3 is also set to a different delivery stream, to such a stream that the predetermined pressure gradient again develops at this single-edge servo valve spool 31 which acts as a metering restrictor.

The parallel-connecting restrictors 40, 50, 96 or 97 and 116 or 117 have the following action:

If two control pressure pick-offs assigned to two different consumers are simultaneously actuated, e.g., the control pressure pick-offs 92 and 90, two single-edge slide valves—31 and 86 in the said case—are simultaneously opened and thus two consumers, namely, the two working cylinders 48 and 49 on the one hand and the working cylinder 86 on the other are simultaneously connected with the same pump 3. The same pressure acts here in the two working cylinders 48 and 49. However, it is not likely that the same pressure incidentally acts also in the working cylinder 86. Rather, one of the consumers becomes more highly loaded and thus requires a higher pressure. Assumed that the pressure in the working cylinder 86 is higher than the pressure in the working cylinders 48 and 49, there is then a higher pressure at the branching point 98 than in the line 43, with the result that the check valve 79 will be closed and the control line system 80, 83 is loaded with the pressure present at the branch point 98 due to opening of the check valve 101. Since the back sides of the slide valves 41 and 241 are also acted upon by this control line system, but different pressures prevail in front of this slided valve in line 35 or 240, a different throttling action is produced at the restrictors 40 and 96, i.e., such a large pressure gradient is produced by this parallel-connecting restrictor 40 in the consumer 48, 49, which produces the lower pressure, that such a high pressure is produced in front of this parallel-connecting restrictor 40 in the line 35 and thus in line 28 and thus in line 12 and thus in line 82, as the consumer 86 requires, in which case a correspondingly less throttling action is effected at the parallel-connecting restrictor 96 due to the pressure in line 240 under the action of the control pressure in line 83, since with it the consumer pressure that acts on the slide valve 241 is sufficiently large to completely open the parallel-connecting restrictor 96 so that no pressure gradient develops at it.

This arrangement of the parallel-connecting restrictors, which are loaded in common by the same control pressure on the back side, has the essential advantage that if two consumers could together absorb a greater stream than pump 3 delivers, the stream delivered by pump 3 to the two consumers—in the present case 48, 49 on the one hand and 86 on the other hand—is distributed proportional to the opening width of the throttle gaps.

The check valves 58 and 68 act as a protection against tube rupture. This means that if a leak occurs in line 12 or line 28 or line 82 or any other line connected to them and the pressure escapes, the consumer that is connected by actuation of the assigned control pressure pick-off and thus opening of the assigned single-edge slide valve cannot sink back under load. For example, if it is raised under load and thus the working cylinders 48 and 49 are under pressure and line 12 ruptures, check valve 58 then closes. The fluid present in the working cylinders 48 and 49 is thus enclosed and fixed, such that no undesirable movement can occur since the relief valve jets 60 and 70 are also closed since no pressure is present in lines 53 and 43 and thus the relief valve jets 60 and 70 are not regulated.

However, if the single-edge servo valve spool 31 is opened by actuation of the control pressure pick-off 92, there is pressure in line 43 so that pressure medium flows through lines 43, 44 into the working cylinders 48 and 49. The pressure in line 43 is also present through line 73 in the control pressure chamber of the relief valve jet 60, so that it opens. This means that the stream of pressure medium flowing from the pressure chambers 56 and 57 of the working cylinders 48 and 49 can flow off unhindered through line 54 into line 59, the relief valve jet 60, lines 61 and 62, and in the partial return line 39 and thus into the return line 102. The speed of movement of the piston in the working cylinders 48 and 49 is to be determined here by the degree to which the single-edge slide valve 31 is opened. If, as a result of external forces, the pistons in the working cylinders 48 and 49 attempt to speed up with respect to this stream, they draw more fluid; as a result, the pressure in line 44 and thus in line 43 drops. The pressure in the control pressure chamber of the relief valve jet 60 is thus also reduced through line 73 so that valve 60 closes to the extent that the pressure drops, that is, a throttling effect is produced in the relief valve jet 60 that throttles the stream flowing out of the pressure chambers 56 and 57, such that the speed of movement of the pistons in the working cylinders 48 and 49 is braked by this throttling action. The relief valve jets 60 and 70 are, however, also controlled by the pressure in lines 59 and thus 54 or 69 and thus 44. The relief valve jets 60 and 70 thus act also as a protection against inadmissibly high pressure in the working cylinders 48 and 49. This means that if an excessively high pressure develops as a result of overloading or jerky loading, either valve 60 or valve 70 opens as a result of the excessive pressure, depending on the direction of loading, so that these relief valve jets 60 and 70 also act as overload-protection overpressure valves, even if neither of the control pressure pick-offs 92 and 93 is actuated.

Especially in the case of pressure medium flowing off through one of the relief valve jets 60 and 70, but also in any other case of oversuction into one of the pressure chambers 46, 47 or 56, 57, the assigned resuction check valve 64 or 66 opens so that the line 102 can be recharged from the tank 103 through the opened resuction check valve 64 or 66 and the line 62 and the partial return line 39.

If the control pressure pick-off 92 has been actuated and thus the single-edge slide valve 31 has been opened and thus the line 43 has been placed under pressure through the delivery line 12 and the lines 28, 29, 35 and now the actuation of control pressure pick-off 92 is ended and the single-edge slide valve 31 is thus brought into the release or discharge position, the parallel-connecting restrictor 40 closes completely. This would have the result that the last-active pressure would persist in line 43 and the relief-valve jet 60 would thus be held in the open position through line 73. However, both relief valve jets 60 and 70 would also be closed if both control pressure pick-offs were closed. Therefore, a check valve 94 opening toward the pump 3 is provided in the slide valve body 41; in the said operating state it has the result that the line 43 is released through the check valve 94 when parallel-connecting restrictor 40 is closed.

The valves on the other side of the control unit 74 and the corresponding valves in the control unit 85 or 100 or 111 function in an analogous manner.

If such a pressure is produced by action on the control pressure pick-off 92 in the pressure pick-off control pressure line 33 that the single-edge servo valve spool 31 opens quite wide, such a forceful stream is thus delivered in lines 29, 35 and thus also 28 and the delivery line 12 that pump 3 alone can no longer deliver it. In this state the coupling unit 179 begins to act. As already stated, the spring acting on the servo control valve 10 for regulating pump 3 through the valve 10 is designed so that a definite pressure gradient develops at the single-edge servo valve spool 31 that acts as a metering restrictor, e.g., a pressure gradient of 20 bar. The spring 186 at the 4-connection/2-position valve 182 is designed so that this valve responds at a lower pressure gradient, ca. 15 bar, between the delivery line 12 and the control pressure line 81. The 4-connection/2-position valve 182 is designed here so that when the slide valve begins to move, the control lines 177 and 178 are first connected with each other, with the result that the pump is swung out so far that the same pressure is present in the delivery line 15 as in the delivery line 12, in which case, if no consumer is connected to pump 4, this pressure is produced in front of the restrictor 176. With a further displacement of the slide valve in the 4-connection/2-position valve 182, the lines 180 and 181 are then also connected together through the valve 182, so that the delivery stream of pump 4 is also delivered into the delivery line 12 of pump 3 through the 4-connection/2-position valve 182, in which case the pump 4 is now swung out so far that it produces precisely the delivery stream that is required to produce the required pressure gradient—15 bar in the present case—at the single-edge servo valve spool 31 which acts as a metering restrictor, together with the delivery stream of pump 3.

Although the consumers are directly protected by the relief-valve jets 60, 70 and the corresponding relief valve jets at the other consumers, it is necessary to protect the pump 3 and the overall arrangement additionally by a relief valve jet that protects a portion of the installation from being damaged by an inadmissibly high pressure. For practical reasons, this relief valve jet is incorporated in the coupling unit 179, i.e., the relief valve jet 184 is connected through line 180 to the delivery line 12 and in a corresponding manner the relief valve jet 185 is connected through line 181 to the delivery line 15 of pump 4 in order to protect it. The opening of one of these relief valve jets has the advantage that pressure medium is released through it at the maximum possible pressure, which means that much energy is wasted in this relief valve jet. It is unavoidable in handling brief pressure surges, but is advantageous if the prolonged opening of this relief valve jet can be avoided. For this purpose, the relief valve jet 157 is assigned to pump 3; it is set at such a low pressure that it opens when a pressure prevails in the control line 81 that with respect to the prescribed pressure gradient at the metering restrictor formed by the single-edge slide valve 31 or 32 or 86 or 87 lies below the response pressure of the relief valve jet 184 so that the relief valve jet 157 opens before valve 184 does and thus limits the maximum possible pressure in the line 152, with the result that with a slight rise in the pressure in line 154 the servo control valve 10 increases the pressure in the pressure chamber 8 of the pump adjusting cylinder 7 and thus sets the pump 3 to a smaller stroke and thus a smaller delivery stream, where it can be expected that after the completion of this regulating process effected by increasing the control pressure the pressure is reduced in the delivery line 12 as a result of the reduced delivery stream and thus the response of relief-valve jet 184 can be avoided.

A corresponding relief valve jet 172 is analogously assigned to pump 4; it responds to the pressure in the control pressure line 166 and opens before valve 185 opens.

With this relief valve jet, however, only a protection against pressure peaks is achieved during the regulating process of the pump. There is no protection against the overloading of engine 1. This is achieved by the maximum-load control device 230. The constant pump 25 delivers through line 188 to the adjustable restrictor 189, whose adjusting element 190 is in operating connection with the adjusting element of the engine 1. The line 195 behind the restrictor leads to the control pressure pick-offs 90, 91, 92, 93, 120, 121, 122, 123, 129 and 130. The externally controlled relief valve jet 196 is connected to this line 195; it is infuenced through line 197 by the pressure in the line 188 in front of the restrictor 189. The relief valve jet 196 is set to the pressure gradient that is to prevail at the restrictor at the prescribed operating r.p.m. If this pressure gradient is present, the relief-valve jet 196 is closed. If the pressure gradient is smaller than provided, the relief valve jet 196 opens and conveys a stream to the subsequent restrictor 199, at which a pressure gradient now also develops and this pressure gradient is switched through lines 203 and 204 as a pressure difference to both sides of the two servo control valves 10 and 13. It is thus achieved that if both pumps 3 and 4 deliver to at least one consumer and the maximum-load control device 230 engages, the two pumps 3 and 4 are proportionally, i.e., percentually, retracted to the same extent so that the direction of movement resulting from the movement overlap is not modified in the case of overlapped movement of two driven working cylinders. The speeds of movement of two consumers switched in are in the same ratio to each other as the openings of the single-edge servo valve spools that act as metering restrictors. Now if the r.p.m. of engine 1 is reduced as a result of its overloading, the pressure gradient at restrictor 189 will decrease and thus open the relief valve jet 196 and thus a pressure gradient will develop at the restrictor 199 that acts on both servo control valves 10 and 23 in an identical manner. The adjustment of both pumps 3 and 4 is thus shifted in the direction to a smaller stroke volume per revolution, but only so far that the pressure gradient at the restrictor 199 and that at the single-edge slide valve acting as a metering restrictor of the consumer switched in maintain an equilibrium. If there is a tendency at one of pumps 3 or 4 to speed up, it immediately receives a countersignal that again equilibrates the two pressure gradients. In this manner the pressure gradients at the single-edge servo valve spools acting as metering throttles of the two consumers are maintained constant, with the result that the absolute quantities and not the ratio of the quantities to each other and thus the ratio of the speeds of movement vary at these single-edge servo valve spools acting as metering throttles.

The relief valve jet 202 serves to protect the constant pump 25. The by-pass relief valve jet 193 also protects the constant pump for the case when the restrictor 189 is closed too far or completely. In this case the oil flows through line 188, line 191, and the relief valve jet 193 into line 194.

The pump 26 is used to charge the pressure reservoir 103; it leads to the steering gear (not shown in the drawing) of the dredger. The return from the steering gear still has sufficient pressure to charge the reservoir 103. For this purpose, the line 239 coming from the steering gear is connected to the line 102.

Pump 25 draws from the housing 24, in which the two pumps 3 and 4 are located, in order to achieve an exchange of pressure medium in the housing 24. The pressure medium flowing back from the steering gear through line 239 flows, provided it is excessive, through the relief valve jet 201 into the pressureless tank 156.

The volume of the reservoir 103 is dimensioned so that leakage losses and volume differences on both sides of the pistons can be compensated even when several consumers are actuated in the same direction.

Figure 11:
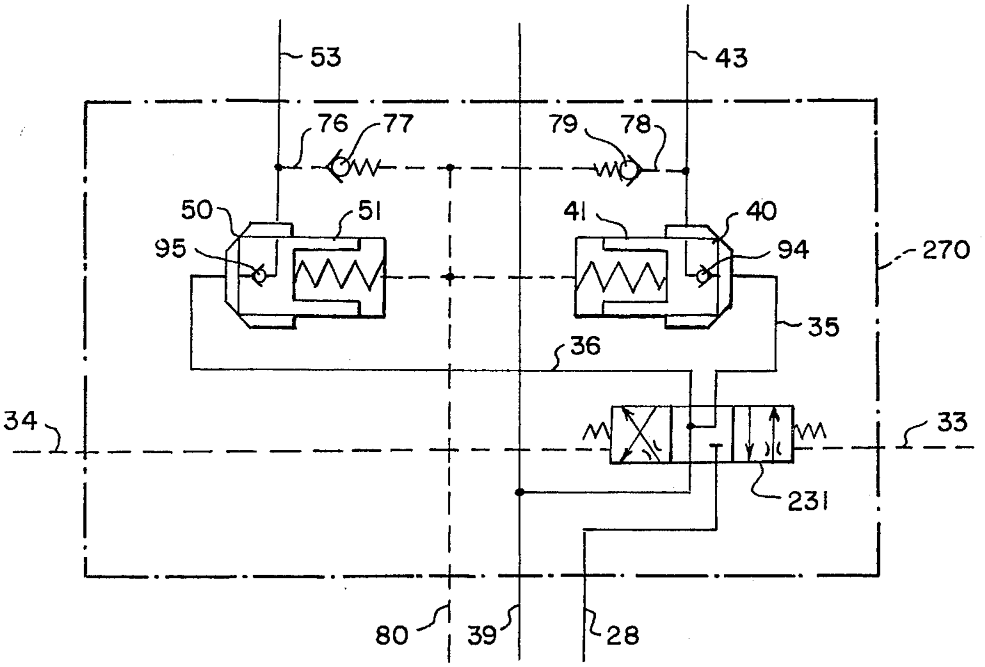
FIG. 11 shows another construction for a partial control unit.

A modified variant of a partial control unit is shown in in FIG. 11. The partial control unit 270 corresponds to partial control unit 27, with the only difference being that instead of the two single-edge servo valve spools 31 and 32, which forms the two metering restrictors in the partial control unit 27, a single 4-connection/3-position valve 231 is provided, which can be regulated by means of the two control pressure pick-offs 92 and 93 through the control pressure lines 33 or 34 and, in the neutral position shown in the drawing, closes off the branch delivery line 28 and connects lines 35 and 36 together and, in a controlled position, connects the branch delivery line 28 with the line 35 and at the same time connects the line 36 with the return line 39 and in the other controlled position connects the branch delivery line 28 with the line 36 and at the same time connects the line 35 with the return line 39.

The supplementary control unit 133 has a somewhat different construction and a different mode of operation than the control units 85 or 110 or 111. The 4-connection/3-position valve 128 is regulated not only by the two control pressure pick-offs 129 and 130, but it is loaded also on the side opposite the controlled side by the delivery pressure in the line 131 or 132 leading to the consumer, so that an equilibrium state sets in at the valve slide of valve 128 when the latter is controlled through one of the control pressure pick-offs 129 or 130. If the pressure drops at the consumer, the valve is opened further, such that a greater stream flows to the consumer and the pressure is thus increases at the consumer on the basis of its characteristics.

Figure 12:
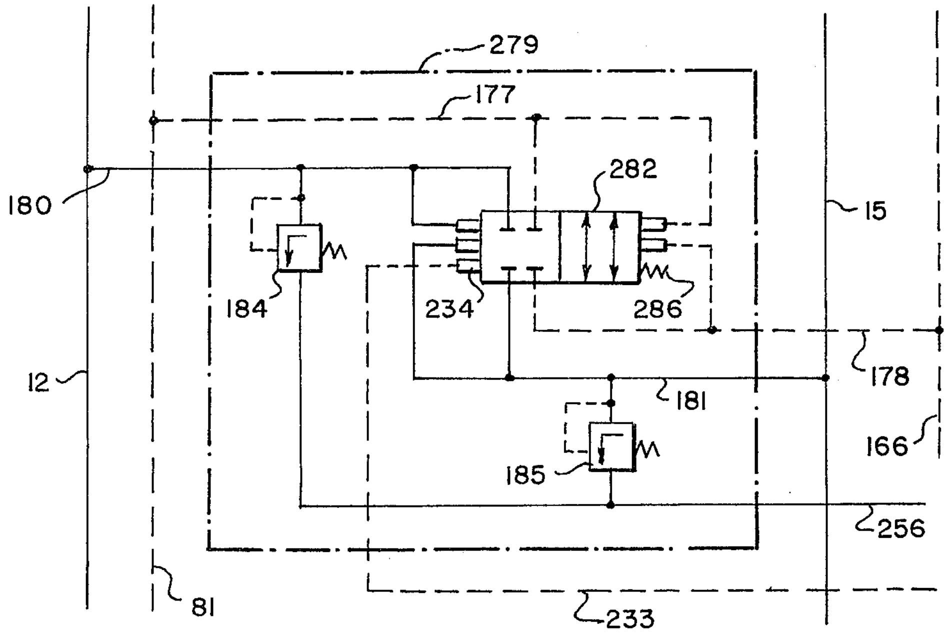
FIG. 12 shows an improved construction for a coupling unit.

A modified varient of a coupling unit is shown in FIG. 12.

The coupling unit 279 corresponds essentially to the coupling unit 179, where the 4-connection/2-position valve 282 corresponds essentially to valve 182. A branch line 180 coming from the delivery line 12 and, opposite it, a coupling control line 177 coming from the control line 81 are connected to valve 282 also in the same manner as to valve 182 and a branch line 181 coming from the delivery line 15 is also connected and a coupling control line 178 coming from the control pressure line 166 is connected to the opposite control pressure chamber.

Figure 4:
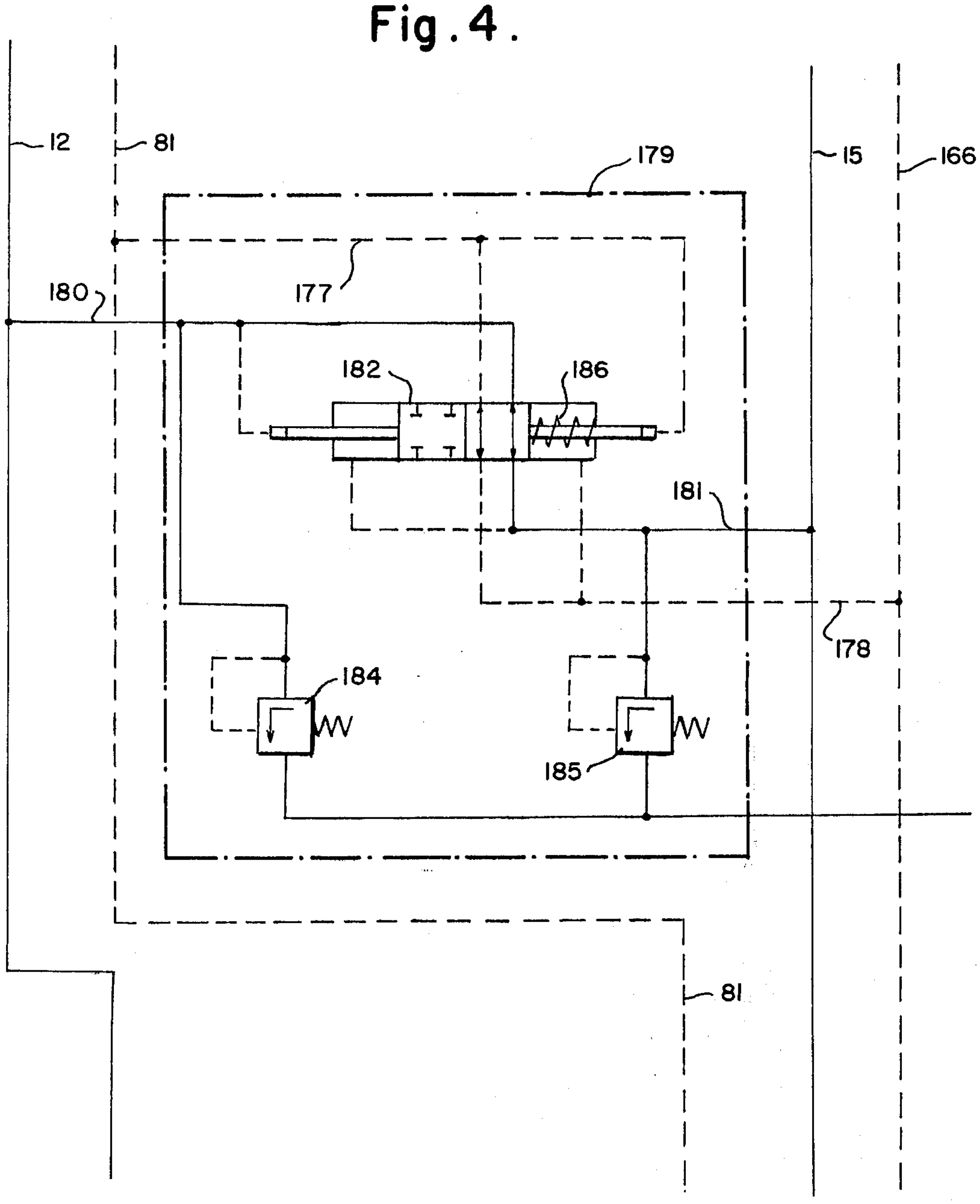
FIG. 4 shows the circuit diagram for the coupling unit 179 of FIG. 1.
Figure 5:
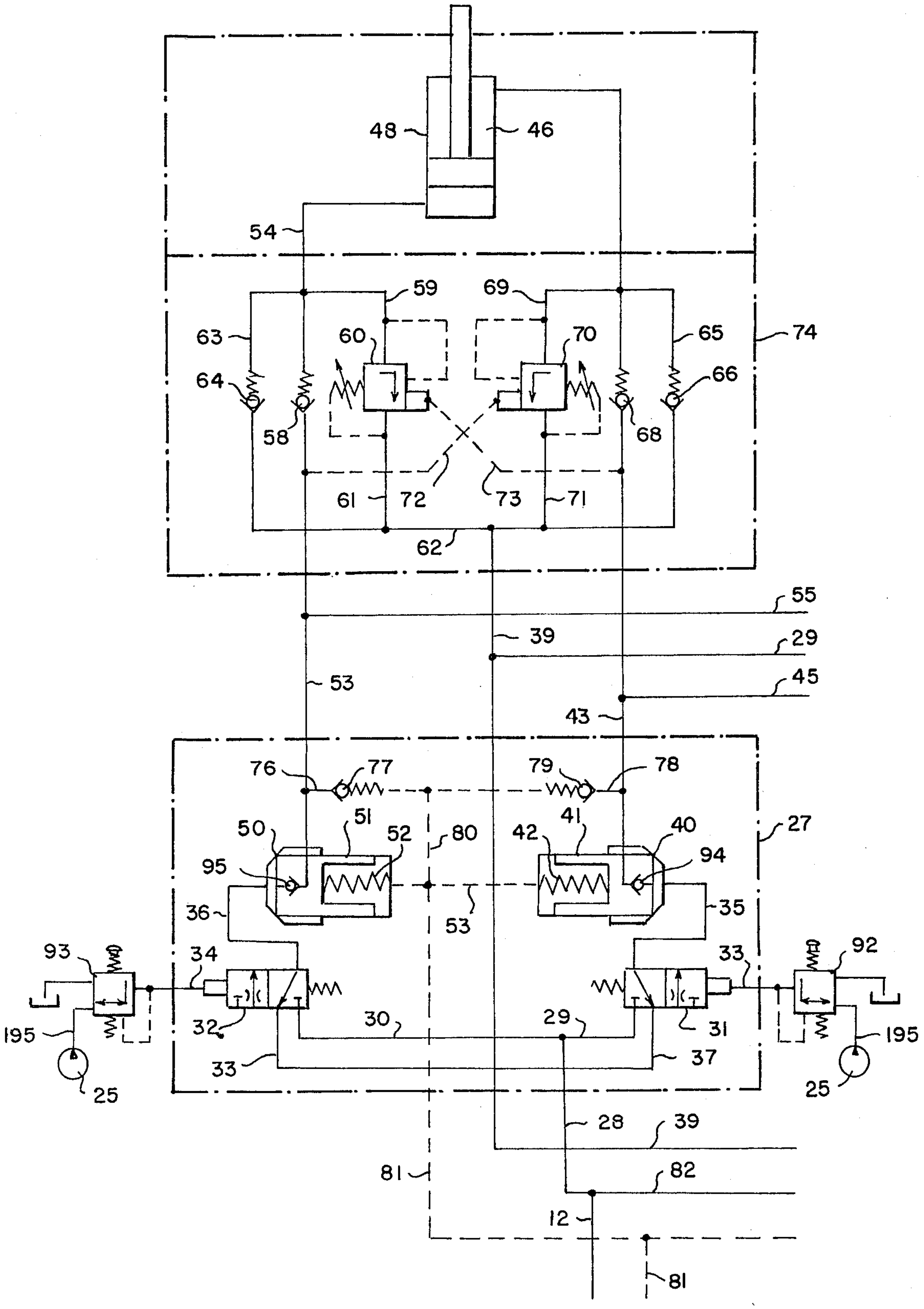
FIG. 5 shows the circuit diagram for the partial control unit 27 and the control unit 74 of FIG. 1.
Figure 6:
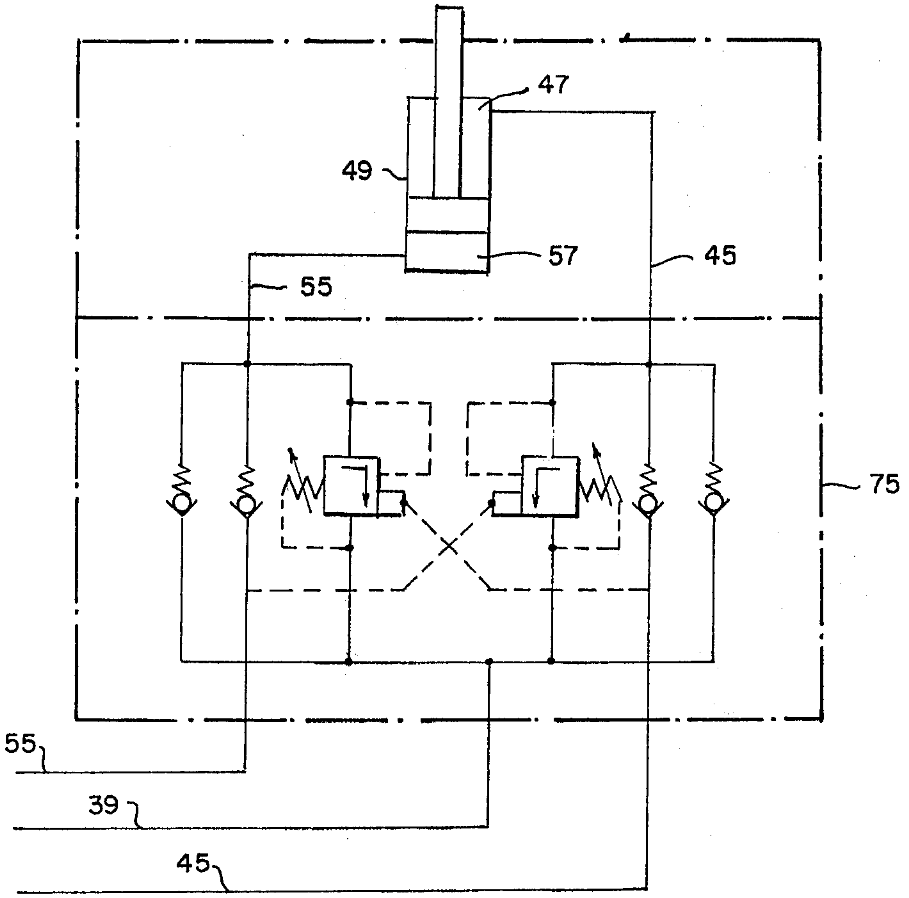
FIG. 6 shows the circuit diagram for the control unit 74 or 75 with assigned consumer of FIG. 1.
Figure 7:
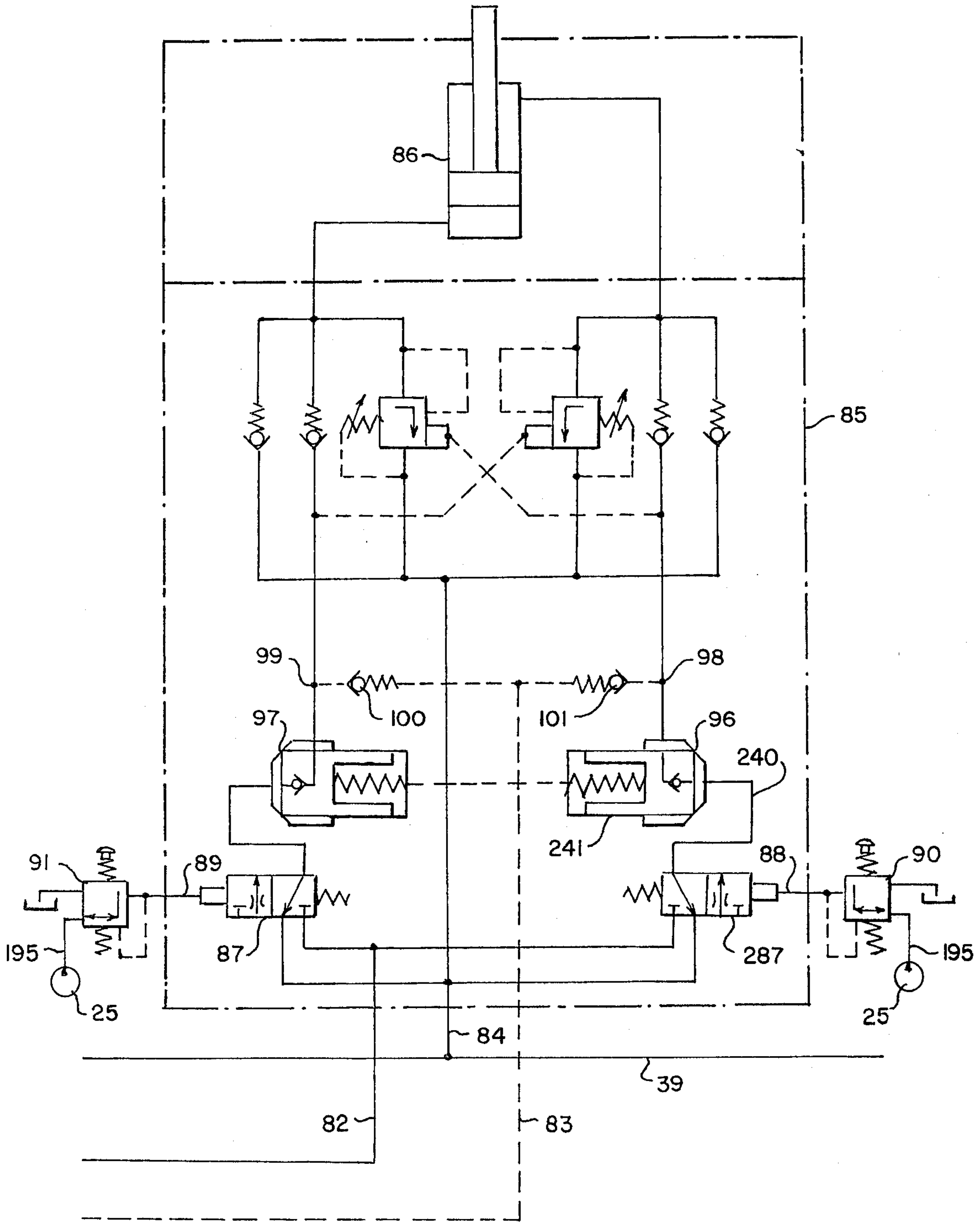
FIGS. 7, 8 and 9 show an overall control unit 85 or 110 or 111 with assigned consumers as used in FIG. 1.
Figure 8:
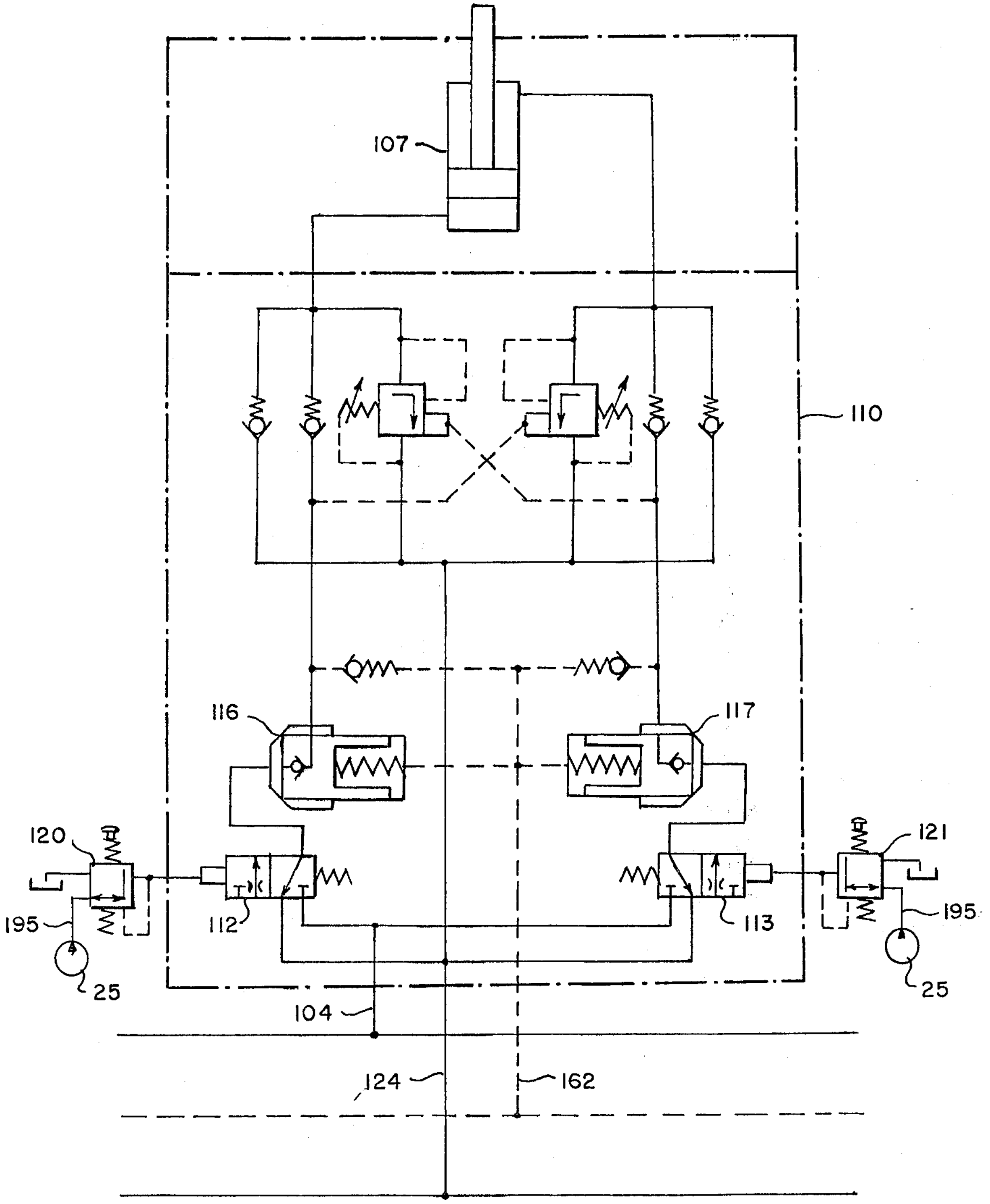
Figure 9:
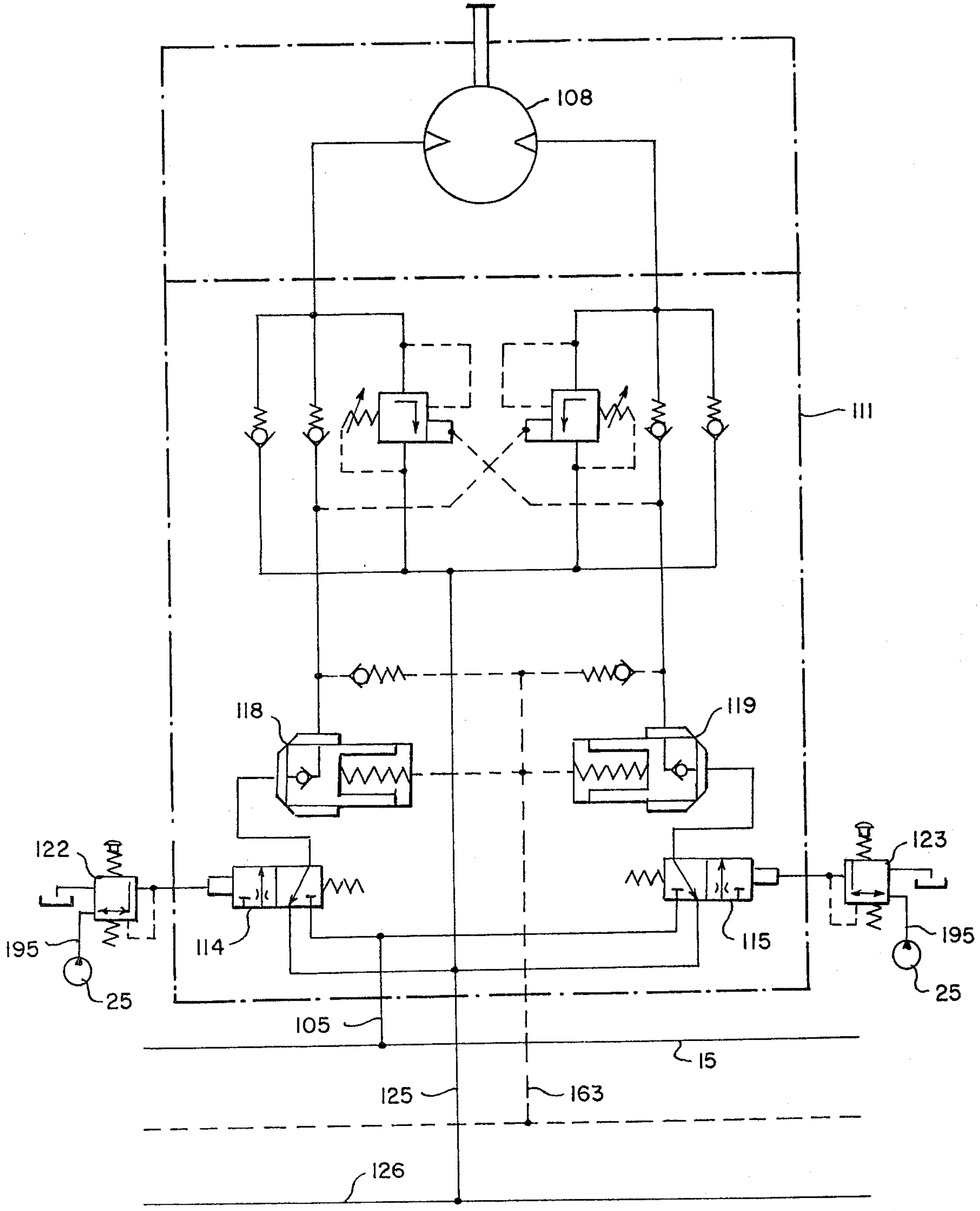
Figure 10:
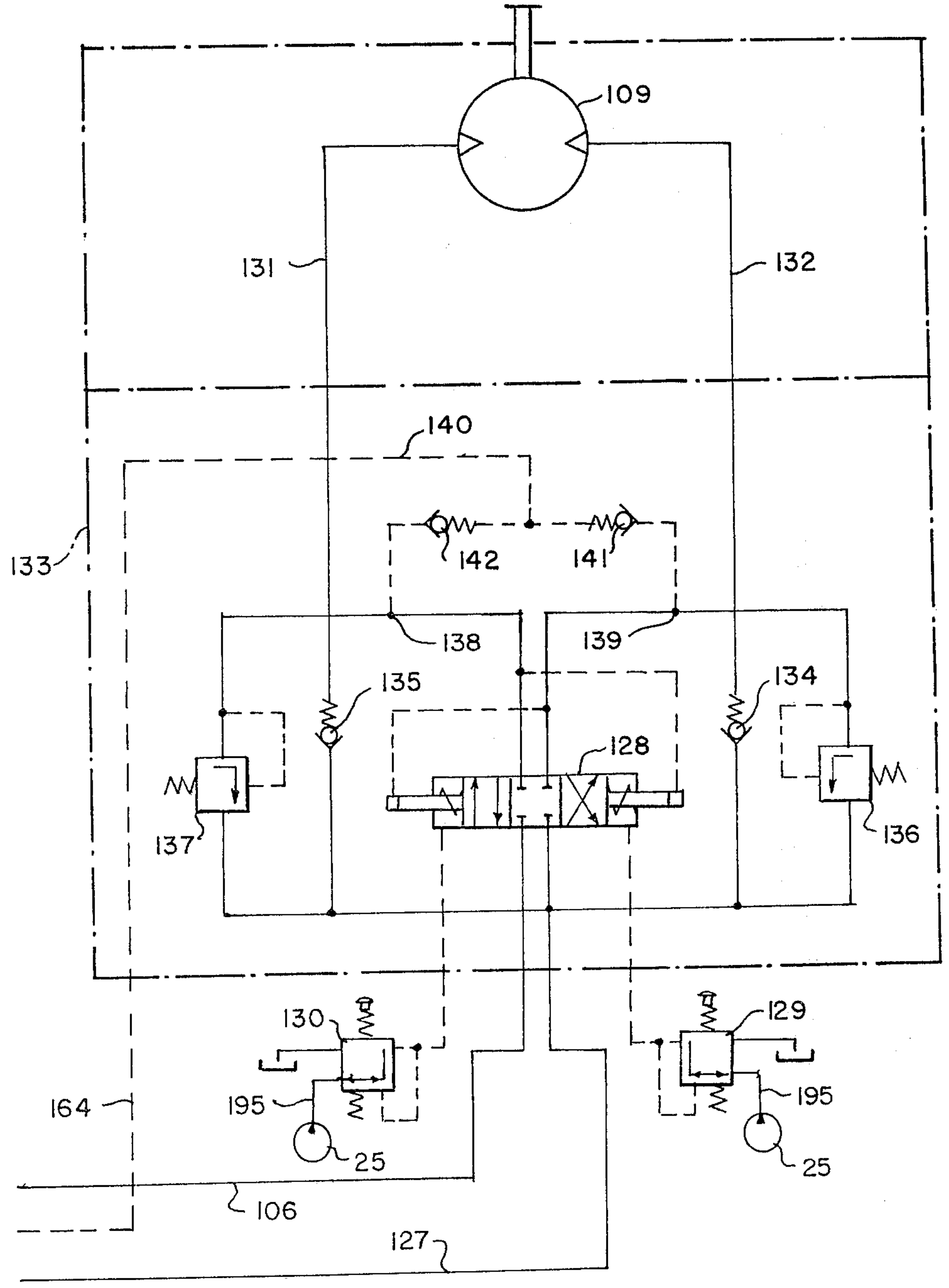
FIG. 10 shows the circuit diagram for a constant pressure regulation system.

In contrast to the valve 182, the valve 183 on the side opposite the pressure spring 286 has a third control pressure chamber 234, which is connected through a line 233 to the maximum-load control element 230 so that when the maximum-load control element 230 sends a signal to the servo control valves 10 and 23, by which the final control element 5 of pump 3 and the final control element 16 of pump 4 are adjusting toward a smaller stroke volume, the coupling valve 282 is prevented from opening. A pressure is thus exerted through the maximum-load control element 230 through the control line 233 on the additional pressure chamber 234, which loads the valve component of the coupling valve 282 toward the closed position. The coupling unit 279 is to control the two delivery lines 12 and 15 of the two pumps 5 and 4 together only if one of the two pumps is set to the maximum possible delivery stream and the pressure gradient at the single-edge servo valve spool 32 acting as a metering restrictor still drops below the prescribed value. This pressure gradient at the single-edge slide valve 31 acting as a metering restrictor is, however, also smaller if the maximum-load regulator 230 engages, with the result that the stroke volume at pump 4 or 5 is adjusted to a smaller value than that of the pressure gradient at the metering restrictor. A coupling unit of the construction shown in FIG. 4 responds on the other hand to any decrease in the pressure gradient at the single-edge servo valve spool 31 acting as a metering restrictor, with the result that the delivery lines 12 and 15 are also connected if the decrease is effected only through the engagement of the maximum-load regulator 230. In order to avoid this disadvantage, the difference in switching pressure at which the coupling unit 279 exerts its coupling function is reduced in an identical degree by loading the third pressure chamber 234, as the pressure gradient at the single-edge servo valve spool 31 acting as the metering restrictor is reduced by the signal of the maximum-load control 230.

It can be readily seen that such a drive system can be expanded without difficulty by connecting additional consumers through one control unit each to the delivery line, the return line, and the control pressure line. It is possible here with this system to load several consumers of any type simultaneously from one pump, even if the consumers are differently loaded.

In the foregoing specification I have set out certain preferred practices and embodiments of my invention, however, it will be understood that this invention may be otherwise embodied within the scope of the following claims.

I claim:

1. In a hydrostatic drive system with an adjustable pump, whose adjusting element is connected with an adjustable pump piston capable of sliding in an adjustable pump cylinder, the position of the piston which is determined by a pressure medium controlled by a servo control valve, at least one consumer of hydrostatic energy in the drive system and a delivery line between the pump and the consumer of hydrostatic energy, as well as a return line leading to the tank, and where several consumers are connected through one branch line each to the delivery line coming from the pump, an arbitrarily actuatable switching element located in each branch line, the improvement comprising in combination:

(a) an adjustable parallel-connecting restrictor located in each branch line, an adjustable element in each said restrictor, the adjusting element of each of said parallel-connecting restrictors being loaded on one side by the pressure in one of the delivery line or the branch delivery line and on the other side by a control pressure and a spring; and (b) means providing a common control pressure at all the parallel-connecting restrictors on one side of the adjusting element, said one side of the adjusting element being connected through a branch control pressure line to a common control pressure line, and a check valve opening toward the common control pressure line located in each branch control pressure line.

2. A drive system according to claim 1, with a consumer, in which the two connections can selectively be a pressure connection and a return connection, characterized in that a check valve opening toward the consumer is located between the parallel-connecting restrictor and the consumer and parallel to it a pressure-controlled relief valve jet, which is controlled by the pressure in the other line leading to the consumer.

3. A drive system according to claim 2, characterized in that the valve group formed of the check valves and relief valve jets is located, together with the parallel-connecting restrictors in an overall control unit.

4. A drive system according to claim 1 with two pumps, where at least one of these two pumps is assigned to several consumers, characterized in that the delivery lines and the control pressure lines of the two pumps are connected to a coupling device, which connects the delivery lines and the control pressure lines together when a certain operating condition is present.

5. A drive system according to claim 4, characterized in that the operating condition is presented by a pressure difference between the delivery line and the assigned control pressure line where this pressure difference is smaller than the predetermined pressure difference desired at the metering throttle.

6. A drive system according to claim 1, characterized in that a relief valve jet is connected to the delivery line and a relief valve jet is connected to the control pressure line, where a restrictor is located between the control pressure line and relief valve jet and where the relief valve jet connected to the control pressure line is set at a lower pressure than the relief valve jet connected to the delivery line and each relief valve jet is controlled by the pressure in the other line.

7. A drive system according to claim 1, characterized in that each branch control pressure line branches off from the line between the parallel-connecting restrictor and a consumer connected thereto.

8. A drive system according to claim 1 or 7 characterized in that the parallel-connecting restrictor is provided with a slide valve, which at the same time is the adjusting element on which the control pressure acts.

9. A drive system according to claim 1 or 7 characterized in that a maximum-load control that releases a pressure signal when the r.p.m. of the drive shaft of the pump drops is provided and that the pressure signal acts on the servo control valve.

10. A drive system according to claim 1 or 7 characterized in that an additional control unit is assigned to one of the consumers in which a 4-connection/3-position valve is located, to which the delivery line and the return line on the one hand and two lines leading to one connection of the consumer on the other hand are connected, where each side of the valve has two pressure chambers, one of which is connected with an arbitrarily actuatable control pressure pick-off and the other is connected with one of the two lines leading to the consumer, where the actuated control pressure pick-off is connected to one side and the pressure-loaded one of the two lines leading to the consumer is connected to the other side of the valve and where a branch line is connected to each of the two lines leading to the consumer, both of which lead to the collecting pressure line, in which case a check valve opening toward the collecting control pressure line is located in each of these two branch lines.

11. A drive system according to claim 1 or 7, characterized in that the control pressure acting on the adjusting elements of the parallel-connecting restrictors is connected to and determines the position of the adjustable pump piston.

12. A drive system according to claim 11 having an adjustable metering restrictor located in a branch line leading to a consumer and said branch line control pressure line is connected beyond this metering restrictor in the direction of flow and leads to the adjusting pressure chamber of a servo control valve that determines the position of the adjustable pump piston, and, in that in the direction of flow of the pressure medium, the metering restrictor and then the parallel-connecting restrictor are located one behind the other, and the branch control pressure line containing a check valve is connected beyond this parallel-connecting restrictor to the branch delivery line, and that all the branch control pressure lines coming from all the branch delivery lines are connected to the common control pressure line and that the latter is connected to the adjusting pressure chamber of the servo control valve, where the adjusting elements of the parallel-connecting restrictors are connected to the common control pressure line.

13. A drive system according to claim 11, characterized in that a branch return line comes from each consumer and that all the branch return lines are connected to a collecting return line and that the pump is a pump drawing from the housing and that the collecting return line is connected to the housing of the pump.

14. A drive system according to claim 13, characterized in that a prestressed pressure reservoir is connected to the collecting return line.

15. A drive system according to claim 1, or 7, having an adjustable metering restrictor located in a branch line leading to a consumer and said branch line control pressure line is connected beyond this metering restrictor in the direction of flow and leads to the adjusting pressure chamber of a servo control valve that determines the position of the adjustable pump piston, and, in that in the direction of flow of the pressure medium, the metering restrictor and then the parallel-connecting restrictor are located one behind the other, and the branch control pressure line containing a check valve is connected beyond this parallel-connecting restrictor to the branch delivery line, and that all the branch control pressure lines coming from all the branch delivery lines are connected to the common control pressure line and that the latter is connected to the adjusting pressure chamber of the servo control valve, where the adjusting elements of the parallel-connecting restrictors are connected to the common control pressure line.

16. A drive system according to claim 15, characterized in that the operating condition is presented by a pressure difference between the delivery line and the assigned control pressure line where this pressure difference is smaller than the predetermined pressure difference desired at the metering throttle.

17. A drive system according to claim 15, with two pumps, where at least one of these two pumps is assigned to several consumers, characterized in that the delivery lines and the control pressure lines of the two pumps are connected to a coupling device, which connects the delivery lines and the control pressure lines together when a certain operating condition is present.

18. A drive system according to claim 15, characterized in that a relief valve jet is connected to the delivery line and a relief valve jet is connected to the control pressure line, where a restrictor is located between the control pressure line and relief valve jet and where the relief valve jet connected to the control pressure line is set at a lower pressure than the relief valve jet connected to the delivery line and each relief valve jet is controlled by the pressure in the other line.

19. A drive system according to claim 15, characterized in that a branch return line comes from each consumer and that all the branch return lines are connected to a collecting return line and that the pump is a pump drawing from the housing and that the collecting return line is connected to the housing of the pump.

20. A drive system according to claim 19, characterized in that a prestressed pressure reservoir is connected to the collecting return line.

21. A drive system according to claim 1, or 7, characterized in that a branch return line comes from each consumer and that all the branch return lines are connected to a collecting return line and that the pump is a pump drawing from the housing and that the collecting return line is connected to the housing of the pump.

22. A drive system according to claim 21, characterized in that a prestressed pressure reservoir is connected to the collecting return line.

23. A drive system according to claim 22 having a consumer that can be operated in both directions, the two connections of which can selectively be the one pressure connection and the other return connection, characterized in that a parallel-connecting restrictor is located in the two lines connected to the consumer.

24. A drive system according to claim 21, characterized in that two consumers connected in parallel to each other are connected to a parallel-connecting restrictor.

25. A drive system according to claim 24, characterized in that all the parallel-connecting restrictors assigned to a consumer are combined into one control unit.

26. A drive system according to claim 21 having a consumer that can be operated in both directions, the two connections of which can selectively be the one pressure connection and the other return connection, characterized in that a parallel-connecting restrictor is located in the two lines connected to the consumer.

27. A drive system according to claim 26, characterized in that all the parallel-connecting restrictors assigned to a consumer are combined into one control unit.

28. A drive system according to claim 27, characterized in that the control unit is located directly on the assigned consumer or on the assigned consumer group.

29. A drive system according to claim 27, characterized in that all the control units of the entire system are combined into one group, in particular, in the form of a valve block.

* * * * *

UNITED STATES PATENT AND TRADEMARK OFFICE
CERTIFICATE OF CORRECTION

PATENT NO. : 4,425,759

DATED : January 17, 1984

INVENTOR(S) : ALFRED KRUSCHE

It is certified that error appears in the above-identified patent and that said Letters Patent is hereby corrected as shown below:

Column 5, line 34, after "delivery", --line-- should be inserted.

Column 8, line 52, "lead" should be --leads--.

Column 8, line 59, "pick-up" should be --pick-off--.

Column 17, line 65, "increases" should be --increased--.

Column 18, line 26, "control" should be --connect--.

Signed and Sealed this

*Twenty-sixth* Day of *June 1984*

[SEAL]

*Attest:*

GERALD J. MOSSINGHOFF

*Attesting Officer* *Commissioner of Patents and Trademarks*

UNITED STATES PATENT AND TRADEMARK OFFICE
CERTIFICATE OF CORRECTION

PATENT NO. : 4,425,759

DATED : January 17, 1984

INVENTOR(S) : ALFRED KRUSCHE

It is certified that error appears in the above-identified patent and that said Letters Patent is hereby corrected as shown below: Title page:

Change the Assignee's address from "Hollriegelskreuth, Fed. Rep. of Germany" to --Abraham-Lincoln-Strasse, Wiesbaden, Fed. Rep. of Germany--.

Signed and Sealed this

*Thirtieth* Day of *April 1985*

[SEAL]

*Attest:*

DONALD J. QUIGG

*Attesting Officer* *Acting Commissioner of Patents and Trademarks*